Figure 1:
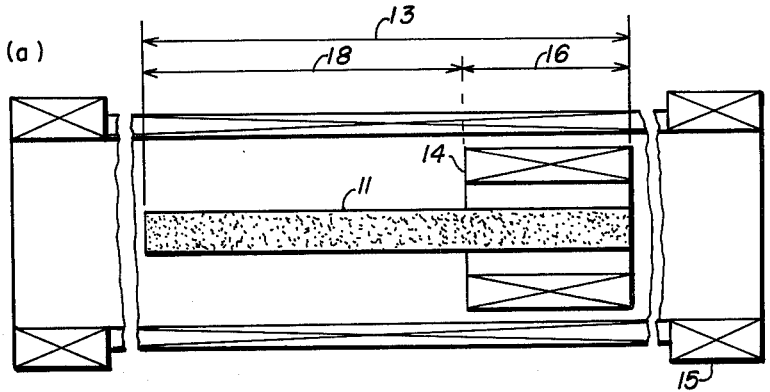
Figure 1:
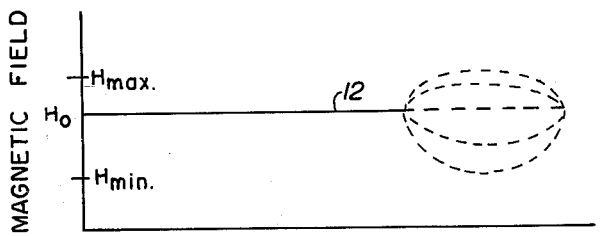

July 12, 1966

L. S. HALL 3,260,869

METHOD FOR REVERSIBLY EXTRACTING ENERGY
FROM A PLASMA BY MAGNETIC PUMPING
Original Filed Feb. 21, 1962

INVENTOR.
LAURENCE S. HALL
BY
*Roland A. Anderson*
ATTORNEY 3,260,869
METHOD FOR REVERSIBLY EXTRACTING ENERGY FROM A PLASMA BY MAGNETIC PUMPING Laurence S. Hall, Livermore, Calif., assignor to the United States of America as represented by the United States Atomic Energy Commission
Original application Feb. 21, 1962, Ser. No. 174,925, now Patent No. 3,116,209, dated Dec. 31, 1963. Divided and this application Nov. 20, 1963, Ser. No. 325,194
5 Claims. (Cl. 310—11)

This application is a divisional application of my original application Serial No. 174,925 filed February 21, 1962, issued as U.S. Patent No. 3,116,209 on December 31, 1963. The invention described herein was made in the course of, or under, contract W-7405-ENG-48 with the United States Atomic Energy Commission.

The present invention is related in general to methods for extracting energy from a plasma and, in particular, to a method for extracting energy from a plasma by employing a continuous-wave, saw-toothed, or other non-sinusoidal, time-varying magnetic field.

One of the more important problems facing controlled thermonuclear fusion today is the possibility of extracting energy from a previously prepared plasma. In particular, the possibility of utilizing sinusoidally oscillating magnetic fields to alternately decompress and compress the plasma (magnetic pumping) has received a great deal of attention. In such utilization of sinusoidally oscillating magnetic fields, the second law of thermodynamics guarantees that a certain amount of irreversibility, and thus heating, will occur. However, the efficiency attainable by use of the irreversible effects alone leaves much to be desired.

The method of the present invention removes the method of magnetic pumping of plasma from the category of an irreversible, thermodynamic effect, and utilizes such method directly for incorporating reversible energy extraction mechanisms. (In a certain sense, this is analogous to exchanging energy in the manner of a Carnot cycle with ordinary thermodynamic problems.) The gain in efficiency is sufficient to warrant the extra effort necessary in providing a source of high power RF with the desired waveform and presents an attractive extraction scheme, even for plasmas sufficiently hot that the collision frequency is very low.

Therefore, it is an object of the present invention to provide a method for extracting energy from a plasma by magnetic pumping.

It is another object of the present invention to provide a method for extracting energy from a plasma by means of a saw-toothed or other non-sinusoidal, time-varying magnetic field.

Yet another object of the present invention is to provide a method for lowering the temperature of a plasma by collision exchange by applying a continuous-wave, non-sinusoidal magnetic field.

Yet a further object of the present invention is to provide a method for changing the temperature of a plasma by transit-time magnetic pumping by applying a continuous-wave, non-sinusoidal, time-varying magnetic field.

Figure 2:
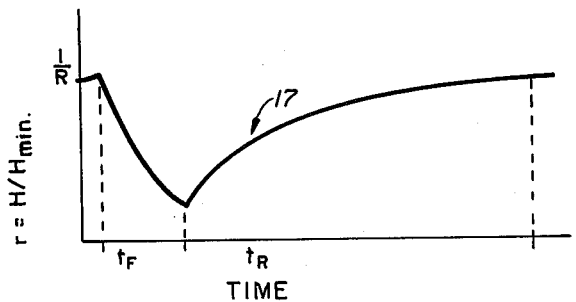

Other objects and advantages will be apparent in the following description and claims considered together with the accompanying drawing, in which FIGURE 1, portion $a$, is a simplified schematic cross sectional view of apparatus utilized in accordance with the concept of the present invention, FIGURE 1, portion $b$, depicts a typical plot of the spatial form of the magnetic field of the apparatus of FIGURE 1$a$, FIGURE 2 is a typical plot of the shape of the oscillating, magnetic-field waveform with respect to time applied to the apparatus of FIGURE 1.

Although the method of the present invention is herein particularly described with relation to a single, limiting case and briefly with respect to two other limiting cases, and with respect to only one apparatus as shown in FIGURE 1, it is to be understood that there are various ways (or apparatus) for applying the concept of the present invention, as well as several other limiting cases. That is, any means of applying a non-sinusoidal magnetic field in the manner of magnetic pumping, as is known in the art, may be employed in the conduct of the present method.

Referring to the figures, there is shown a cylindrically symmetric rod of plasma 11, confined radially by the presence of a static magnetic field 12 of magnitude $H_0$ and of overall length 13. For example, length 13 might represent the distance around a closed loop of plasma, such as, for example, the plasma loop in a stellerator device, or it might represent the distance between two strong magnetic mirrors in a straight plasma column of a magnetic-mirror device, such as depicted by numeral 15. Located somewhere within the volume L of the length 13 (as computed per unit cross-sectional area), is an extractor 14 of length 16 comprising a magnetic coil capable of imposing a time-varying magnetic field of the form indicated in FIGURE 2 by numeral 17. Instead of a single period, as in a sinusoidal curve form, there are now two time constants associated with the oscillating magnetic field: $\tau_R$, the time in which it takes the field to rise from its minimum value to its maximum; and $\tau_F$, the time it takes the magnetic field to fall back (or decay) to its smallest value. (There are actually two relevant transit times as well; that appropriate to traversal of $L_H$, length 16 of the extractor, and that appropriate to traversal of L, the overall length 13. Since $L_H$ is always of the order of L in the optimum situation, there will be no attempt to distinguish between these two relevant transit-time quantities in the description of the present invention.)

In the situation which can be expressed as $$\tau_{cy} \ll \tau_F \ll \tau_{tr}, \tau_{coll}$$

(where $\tau_{cy}$ is the cyclotron period of a charged particle's orbit in the external magnetic field, $\tau_{tr}$ is the time of transit of a typical ion through the length 16, and $\tau_{coll}$ is the time for a 90° deflection of an ion due to collisions), the three limiting cases are herein considered:

(I) $\tau_{coll} \ll \tau_R \ll \tau_{tr}$, collision extraction;
(II) $\tau_{tr} \ll \tau_R \ll \tau_{coll}$, transit-time extraction;
(III) $\tau_{tr} \ll \tau_{coll} \ll \tau_R$, collisional transit-time extraction.

Cases I and II correspond roughtly to the collision extraction and transit-time extraction limits, respectively, of the irreversible theory. Case III is a hybrid limit which has some of the features of each of the previous cases. In all instances, the falling magnetic field corresponds to an adiabatic magnetic decompression (the word magnetic referring to a decompression in which the magnetic moments of the individual particles are conserved) in which the ions originally inside the extractor 14 find their transverse energy decreased by a factor R, the ratio of final-to-initial magnetic field in the decompression. As previously mentioned, disclosure of the present invention is particularly drawn to the preferred Case II, supra, and briefly drawn to the alternative Cases I and III.

Therefore, if the magnetic field is compressed slowly, as specified by the above-noted different Cases I, II, and III, there results the following:

*Case I:* The ions distribute their energy continuously among all three degrees of freedom, resulting in an adiabatic (in the thermodynamic sense) compression with $\gamma = 5/3$. The net effect of the whole cycle is to extract the energy from the plasma equally from each of the three degrees of freedom.

*Case II:* The ions originally in the extractor 14 region mix irreversibly with those in the external regions shown as length 18 in FIGURE 1, effectively increasing the average transverse energy of the ions in the extractor 14. Thus, the heating effect of an adiabatic compression is essentially reduced by the ratio.

$$\lambda = \frac{(L_H/V_\parallel^H)}{(L_H/V_\parallel^H) + (L_E/V_\parallel^E)} \tag{1}$$

where $$V_\parallel^H \text{ and } V_\parallel^E$$

are the ion's longitudinal velocities in the extractor 14 and external regions (numeral 18), respectively. The factor $\lambda$ occurs since each ion is in the extractor 14 only this fraction of the time. This case also results in a net energy extraction from the plasma 11, but in this situation, the energy is all removed from the longitudinal motion (since the magnetic moments of the individual particles are conserved throughout the process).

*Case III:* As in Case II, the ions mix irreversibly throughout the whole volume L of length 13. However, in this case, the energy is removed from all three degrees of freedom and the compression is to be considered adiabatic (in the thermodynamic sense) with $\gamma = 5/3$.

To calculate $\Delta \epsilon$ (the net heat transfer over a complete cycle normalized so as to be computed per particle in the whole volume L of the length 13), let T denote the ambient temperature of the ions and utilize subscripts $\parallel$ and $\perp$ as necessary to distinguish between the longitudinal and transverse directions, respectively. $\Delta \epsilon$ is counted negative if energy is removed from the plasma.

Thus, referring to Case I, the transverse energy of particles inside the extractor 14 after decompression is $RkT$, whereas the parallel energy remains at the value $(1/2)kT$ ($k$ = Boltzman's constant). Hence, after a time of the order of $\tau_{coll}$, the average energy per particle in the volume $L_H$ of length 16 is $(1/2)(2R+1)kT$. Then since these particles do not move out of the extractor 14 during $\tau_R$, the energy per particle in the volume $L_H$ after the adiabatic compression ($\gamma = 5/3$) is just $(1/2)R^{-2/3}(2R+1)kT$.

Defining $$\lambda = L_H/L \tag{2}$$

we obtain the average energy loss per cycle per particle in L (for Case I), $$\Delta \epsilon^I = \lambda_0 [(1/2)R^{-2/3}(2R+1) - 3/2]kT \tag{3}$$

Clearly, $$\Delta \epsilon^I < 0 \text{ for } R < 1 \tag{4}$$

In the transit-time extraction, Case II of previous mention, the transverse energy of particles inside the extractor 14 after decompression is also $RkT$ (see FIGURE 2), whereas the parallel energy remains at the value $(1/2)kT$. During compression, utilizing the conservation of the magnetic moment and the definition of $\lambda$ of previous mention, there results the relation $$d(\ln \epsilon_\perp^{II}) = \lambda d(\ln r) \tag{5}$$

where $\epsilon_\perp^{II}$ is the perpendicular energy and $r$ is the ratio (inside the extractor 14) of the instantaneous magnetic field to the magnetic field at the minimum of the cycle (see FIGURE 2) of the extraction Case II. Because of the constancy of the total energy and of the magnetic moment of an individual particle, the ions' longitudinal velocities will be greatest at a position of field minimum and least at the field maximum with the actual values of $$V_\parallel^H/V_\parallel^E$$

depending on the individual particle. If $H_{max}$, the maximum magnetic field in the extractor 14, is greater than $H_0$, the field in the external region, some of the cooler particles will be entirely reflected near the peak of the cycle. Thus, depending on the D.C. bias of the magnetic field in the extractor 14, the average value of $\lambda$ can tend to be either larger or smaller than $\lambda_0 (= L_H/L)$.

If $H_{max} = H_0$, then $\lambda$ tends to be less than $\lambda_0$ because of the direction of the magnetic field gradient, and a pessimistic estimate of the net energy loss per cycle is obtained by substituting $\lambda_0$ for $\lambda$ in the above Equation 5. The equation can then be integrated to obtain the energy given to the coils by each kind of particle ("cooled" and "uncooled") during the decompression. Thus, $$\Delta \epsilon_\parallel^{II} < \Delta \epsilon_0^{II} \equiv \{[\lambda_0 R + (1-\lambda_0)]R^{-\lambda_0} - 1\}kT_\perp \tag{6}$$

where the energy is again computed per particle in the total volume L of the length 13. As mentioned previously, the constancy of the magnetic moment requires the transverse energy of a given particle in the extractor 14 to be the same before and after the extraction cycle, so that $$\Delta \epsilon_\parallel^{II} = \Delta \epsilon^{II}; \quad \Delta \epsilon_\perp^{II} = 0 \tag{7}$$

and, $$\Delta \epsilon^{II} < \Delta \epsilon_0^{II} < 0 \text{ for } R < 1 \tag{8}$$

Referring now to the case of the hybrid collisional and transmit-time heating (Case III above), the compression calculation is again unchanged from that of the previous computations. In compressing, the volume decreases by the factor $$(L_E + RL_H)/L = 1 + (R-1)\lambda_0 \tag{10}$$

if we assume as in Case II that $H_{max} = H_0$. Hence, $$\Delta \epsilon^{III} < \{[\lambda_0(2R+1)/2 + 3(1-\lambda_0)/2][1+(R-1)\lambda_0]^{-2/3} - 3/2\}kT \tag{11}$$

or $$\Delta \epsilon^{III} < \Delta \epsilon_0^{III} \equiv \{[3/2 + \lambda_0(R-1)][1+\lambda_0(R-1)]^{-2/3} - 3/2\}kT \tag{12}$$

In general, in comparing the extraction cycles, $\lambda_0$ can be chosen (within the range $0 \leq \lambda_0 \leq 1$) so as to maximize the extraction for a given value of R in any one of the three cases considered. In both cases involving collisions, the optimum choice (at least on the basis of the pessimistic estimate of the effects of phase mixing) is at $\lambda_0 = 1$. This is with the assumption that it is as easy to provide a big extractor as it is to provide a small one. Indeed, $\Delta \epsilon_0^{III}$ is equal to $\Delta \epsilon^I$ in both the limits $\lambda_0 = 1$ and $\lambda_0 = 0$ (no extractor). Hence, whenever $\tau_{tr} \ll \tau_{coll} \ll \tau_R$, the losses from phase mixing, which are the bases of transit-time extraction, are not sufficient to compensate for the gains in collision heating, at least on the basis of the present pessimistic estimate, and it pays to make the extractor as large as possible.

As a particular example of Method II, consider plasma of $10^{13}$ particles/cm.$^3$ occupying a column of radius 1 cm. and length 50 cm., with an extractor of length 10 cm., and having an ambient temperature of $10^3$ e.v., and with $\tau_F \cong .5$ $\mu$sec., $\tau_R \cong 5$ $\mu$sec. In such a case, taking $R = \frac{1}{2}$ enables a transfer of approximately 10 kw. of power from the plasma.

Cooperative interactions may take the place of collisions in preventing very large differences between $T_\perp$ and $T_\parallel$ in the case of transit-time extraction; for example, through the effects of so-called fire-hose instabilities. (Where such effects are not sufficient as they naturally occur, they may be promoted by supplying a region of reduced static magnetic field somewhere in the length 18. Alternately, it is sometimes desirable to introduce regions of (spatially) rapidly varying magnetic fields in which the particles' magnetic moments are no longer conserved, and which then effectively act as artificial scatterers in smoothing out the velocity-space anisotropies.) In any event, the fact that transit-time magnetic pumping only decreases the energy of the parallel motion is not a prohibitively serious difficulty.

While the invention has been disclosed herein with respect to a preferred and two alternative embodiments (as related to a single apparatus for performing the three embodiments), it will be apparent that numerous variations and modifications may be made within the spirit and scope of the invention, and thus it is not intended to limit the invention except by the terms of the following claims.

What is claimed is:

1. A method of extracting energy from a plasma comprising the steps of:
    (a) confining a plasma by a first externally-imposed static magnetic field, said first magnetic field having a constant magnitude $H_0$ for at least a substantial portion thereof;
    (b) applying a second externally-imposed time-varying magnetic field to at least a portion of said confined plasma;
    (c) causing said time-varying field to fall from a magnitude $H_{max}$ to a magnitude $H_{min}$ in a time interval $\tau_F$;
    (d) causing said time-varying field to increase from said magnitude $H_{min}$ to said magnitude $H_{max}$ in a time interval $\tau_R$, wherein the following time relationships are simultaneously satisfied:
        (1) $\tau_F$ is substantially less than $\tau_R$,
        (2) both $\tau_F$ and $\tau_R$ are substantially greater than $\tau_{cy}$, where $\tau_{cy}$ is the cyclotron period,
        (3) $\tau_{cy} \ll \tau_F \ll \tau_{tr}, \tau_{coll}$; where $\tau_{tr}$ is the ion transit time, and $\tau_{coll}$ is the time for a 90° deflection of an ion,
    (e) and repeating steps (b) through (d) above until the desired energy is extracted from the plasma.

2. The method of claim 1 additionally defined by $\tau_{coll} \ll \tau_R \ll \tau_{tr}$.

3. The method of claim 1 additionally defined by $\tau_{tr} \ll \tau_{coll} \ll \tau_R$.

4. The method of claim 1 additionally defined by $\tau_{tr} \ll \tau_R \ll \tau_{coll}$.

5. The method of claim 4 wherein said plasma has a density of $10^{13}$ particles/cm.³, and an ambient temperature of $10^3$ e.v. before step (c), and occupies a cylindrical column of radius 1 cm. and length 50 cm., $\tau_F = .5$ μsec. and $\tau_R = 5$ μsec.; and the ratio of the minimum value of said second magnetic field to the maximum value of said second magnetic field equals one-half (½).

References Cited by the Examiner

UNITED STATES PATENTS

| | | | |
|---|---|---|---|
| 2,997,641 | 8/1961 | Baker et al. | 310—11 X |
| 3,039,569 | 6/1963 | Post | 310—11 X |
| 3,116,209 | 12/1963 | Hall | 176—3 |

FOREIGN PATENTS 859,447　1/1961　Great Britain.

REUBEN EPSTEIN, *Primary Examiner.*